(12) United States Patent
Cooley

(10) Patent No.: US 8,943,587 B2
(45) Date of Patent: Jan. 27, 2015

(54) SYSTEMS AND METHODS FOR PERFORMING SELECTIVE DEEP PACKET INSPECTION

(75) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 79 days.

(21) Appl. No.: 13/615,444

(22) Filed: Sep. 13, 2012

(65) Prior Publication Data

US 2014/0075554 A1  Mar. 13, 2014

(51) Int. Cl.
*G06F 21/00* (2013.01)
(52) U.S. Cl.
USPC .......................................................... 726/22
(58) Field of Classification Search
None
See application file for complete search history.

(56) References Cited

U.S. PATENT DOCUMENTS

| 6,157,644 | A  | * | 12/2000 | Bernstein et al. | ............. | 370/392 |
| 8,059,532 | B2 | * | 11/2011 | Riddle et al. | .................. | 370/230 |
| 8,397,284 | B2 | * | 3/2013 | Kommareddy et al. | ........ | 726/13 |
| 8,661,241 | B1 | * | 2/2014 | Orr | ................................ | 713/151 |
| 2011/0113490 | A1 | * | 5/2011 | Wang et al. | ...................... | 726/22 |
| 2011/0138463 | A1 | * | 6/2011 | Kim et al. | ......................... | 726/22 |
| 2012/0174217 | A1 | * | 7/2012 | Ormazabal | ..................... | 726/22 |
| 2012/0216282 | A1 | * | 8/2012 | Pappu et al. | ..................... | 726/23 |

FOREIGN PATENT DOCUMENTS

| EP | 1764951 | 3/2007 |
| WO | WO-2006/108281 | 10/2006 |
| WO | WO-2007/088424 | 8/2007 |
| WO | WO-2009/015461 | 2/2009 |
| WO | WO-2009/095388 | 8/2009 |

* cited by examiner

*Primary Examiner* — Minh Dinh
(74) *Attorney, Agent, or Firm* — ALG Intellectual Property, LLC

(57) ABSTRACT

A computer-implemented method for performing selective deep packet inspection may include 1) identify a traffic flow that includes a stream of data packets, 2) sample at least one packet from the stream of data packets, 3) analyze the sampled packet using a computing resource to determine whether the traffic flow is trustworthy, 4) determine that the traffic flow is trustworthy based on analyzing the sampled packet, and 5) divert the traffic flow to a hardware accelerator in response to determining that the traffic flow is trustworthy. Various other methods, systems, and computer-readable media are also disclosed.

12 Claims, 6 Drawing Sheets

SYSTEMS AND METHODS FOR PERFORMING SELECTIVE DEEP PACKET INSPECTION

BACKGROUND

People increasingly rely on the Internet for business and personal use. Unfortunately, the Internet has become a major vector for malware, spam, system intrusions, and other information security vulnerabilities. In order to protect computing systems from undesired and/or illegitimate network traffic, some traditional systems may perform deep packet inspections, analyzing the content and/or characteristics of network packets in transit.

Some traditional deep packet inspection systems may be implemented with software. Unfortunately, software-based deep packet inspection may consume a significant amount of computing resources, such as central processing unit resources. Accordingly, traditional software-based deep packet inspection may require expensive hardware configurations and/or slowing network traffic. Some alternative traditional deep packet inspection systems may be implemented with dedicated hardware components (e.g., either with firmware and/or a dedicated hardware design). Unfortunately, traditional hardware-based deep packet inspection may require complex microcode engines and/or present significant engineering problems. Moreover, traditional hardware-based deep packet inspection systems may be difficult to maintain and update and, therefore, may be unsuited for adapting quickly to new threats. Accordingly, the instant disclosure identifies and addresses a need for systems and methods for performing selective deep packet inspection.

SUMMARY

As will be described in greater detail below, the instant disclosure generally relates to systems and methods for performing selective deep packet inspection by sampling one or more packets of a traffic flow to analyze (e.g., using software-based deep packet inspection) to determine that the traffic flow is trustworthy and diverting the traffic flow to a hardware accelerator in response to determining that the traffic flow is trustworthy.

In one example, a computer-implemented method for performing selective deep packet inspection may include 1) identifying a traffic flow that includes a stream of data packets, 2) sampling at least one packet from the stream of data packets, 3) analyzing the sampled packet using a computing resource to determine whether the traffic flow is trustworthy, 4) determining that the traffic flow is trustworthy based on analyzing the sampled packet, and 5) diverting the traffic flow to a hardware accelerator in response to determining that the traffic flow is trustworthy.

In some examples, the computing resource may include a central processing unit and/or a software module. In some embodiments, analyzing the sampled packet may include inspecting the origin of the sampled packet, the destination of the sampled packet, and/or the content of the sampled packet. In one example, diverting the traffic flow to the hardware accelerator may entail diverting the traffic flow away from the computing resource.

In some embodiments, the computer-implemented method may also include 1) retrieving data from the hardware accelerator useful for describing a rate of the traffic flow, 2) determining, based on the data, that the rate of the traffic flow has changed beyond a predetermined threshold subsequent to determining that the traffic flow is trustworthy, and 3) sampling at least one additional packet from the traffic flow and analyzing the additional packet to reassess whether the traffic flow is trustworthy in response to determining that the rate of the traffic flow has changed beyond the predetermined threshold. In these embodiments, the computer-implemented method may further include 1) determining that the traffic flow is still trustworthy based on analyzing the additional packet and 2) diverting the traffic flow back to the hardware accelerator in response to determining that the traffic flow is still trustworthy.

In some examples, the computer-implemented method may also include 1) retrieving data from the hardware accelerator useful for describing a directionality of the traffic flow, 2) determining, based on the data, that the directionality of the traffic flow has changed beyond a predetermined threshold, and 3) sampling at least one additional packet from the traffic flow and analyzing the additional packet to reassess whether the traffic flow is trustworthy in response to determining that the directionality of the traffic flow has changed beyond the predetermined threshold. In these examples, the computer-implemented method may further include 1) determining that the traffic flow is still trustworthy based on analyzing the additional packet and 2) diverting the traffic flow back to the hardware accelerator in response to determining that the traffic flow is still trustworthy.

In some embodiments, the computer-implemented method may also include 1) retrieving data from the hardware accelerator useful for determining whether a payload transfer has completed, 2) determining, based on the data, that the payload transfer has been completed, and 3) sampling at least one additional packet from the traffic flow and analyzing the additional packet to reassess whether the traffic flow is trustworthy in response to determining that the payload transfer has been completed. In these embodiments, the computer-implemented method may further include 1) determining that the traffic flow is still trustworthy based on analyzing the additional packet and 2) diverting the traffic flow back to the hardware accelerator in response to determining that the traffic flow is still trustworthy.

In one embodiment, a system for implementing the above-described method may include 1) an identification module programmed to identify a traffic flow that comprises a stream of data packets, 2) a sampling module programmed to sample at least one packet from the stream of data packets, 3) an analysis module programmed to analyze the sampled packet using a computing resource to determine whether the traffic flow is trustworthy, 4) a determination module programmed to determine that the traffic flow is trustworthy based on analyzing the sampled packet, and 5) a diversion module programmed to divert the traffic flow to a hardware accelerator in response to determining that the traffic flow is trustworthy. The system may also include at least one processor configured to execute the identification module, the sampling module, the analysis module, the determination module, and the diversion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a traffic flow that includes a stream of data packets, 2) sample at least one packet from the stream of data packets, 3) analyze the sampled packet using a computing resource to determine whether the traffic flow is trustworthy, 4) determine that the traffic flow is trustworthy based on analyzing the sampled packet, and 5) divert the traffic flow to a hardware accelerator in response to determining that the traffic flow is trustworthy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
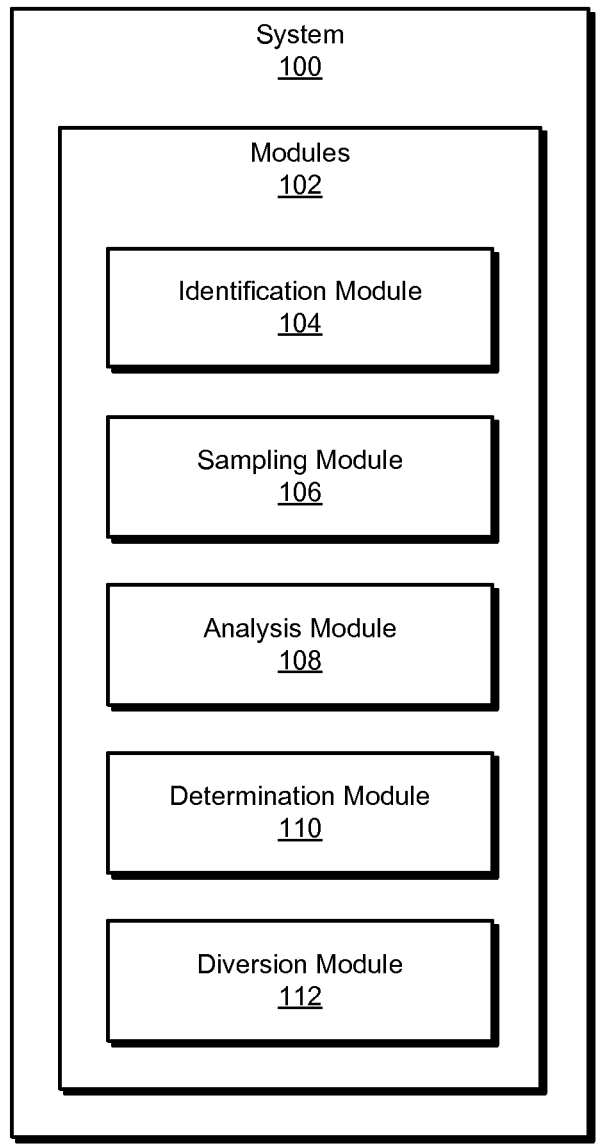
FIG. 1 is a block diagram of an exemplary system for performing selective deep packet inspection.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing selective deep packet inspection. As will be explained in greater detail below, by sampling one or more packets of a traffic flow to analyze (e.g., using software-based deep packet inspection) to determine that the traffic flow is trustworthy and diverting the traffic flow to a hardware accelerator in response to determining that the traffic flow is trustworthy, the systems and methods described herein may effectively analyze network traffic without consuming the computing resources necessary to inspect each packet of network traffic. Furthermore, in some examples, the systems and methods described herein may maintain the accuracy of such trustworthiness assessments by retrieving statistical information from the hardware accelerator potentially indicating significant changes in the traffic flow, these systems and methods may temporarily divert the traffic flow back to more resource-intensive deep packet inspection methods, thereby enabling these systems and methods to reassess the trustworthiness of the traffic flow at times when the trustworthiness of the traffic flow may be most likely to change (and, e.g., maintaining the accuracy of these systems and methods while minimizing resource usage by these systems and methods).

Figure 2:
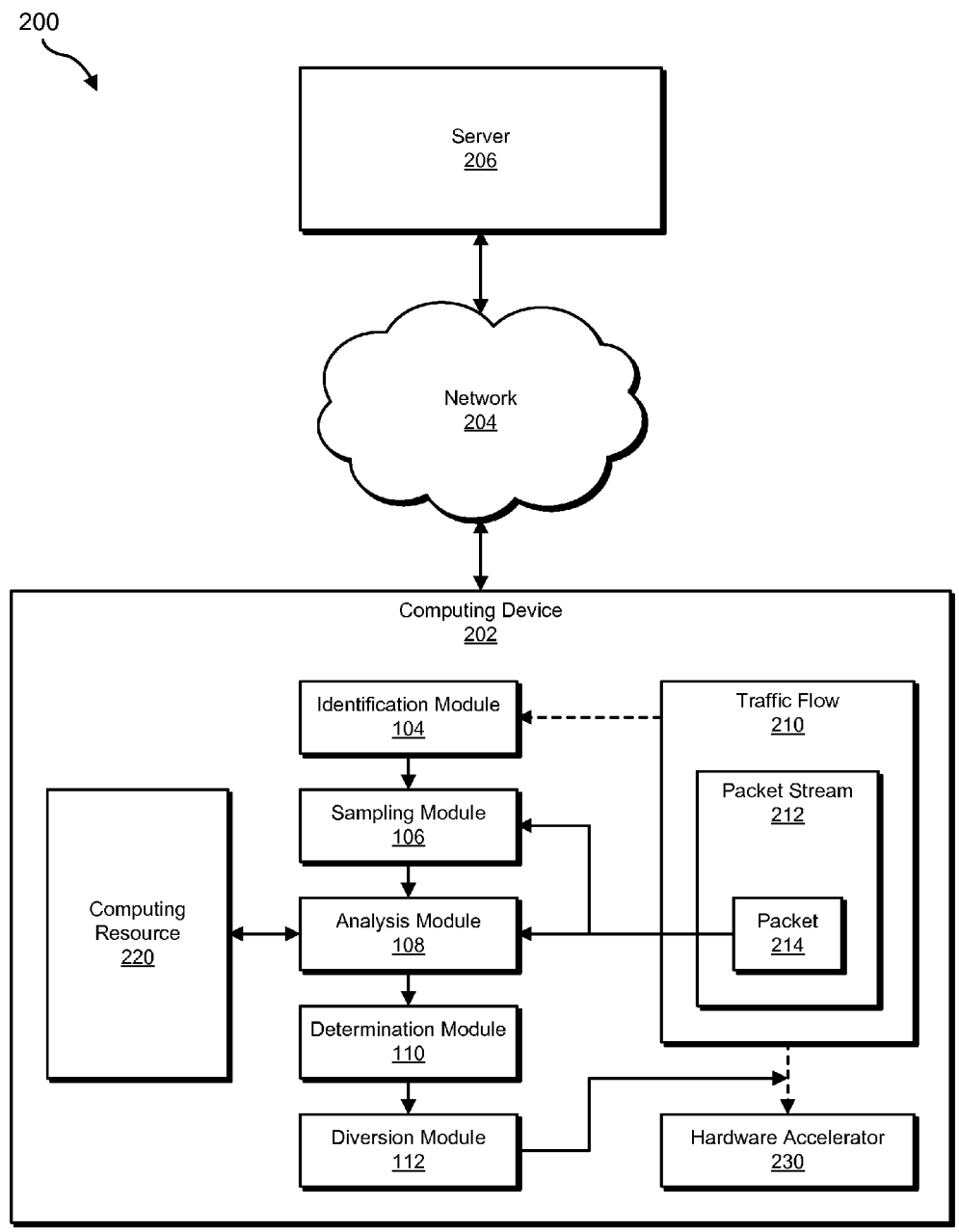
FIG. 2 is a block diagram of an exemplary system for performing selective deep packet inspection.
Figure 3:
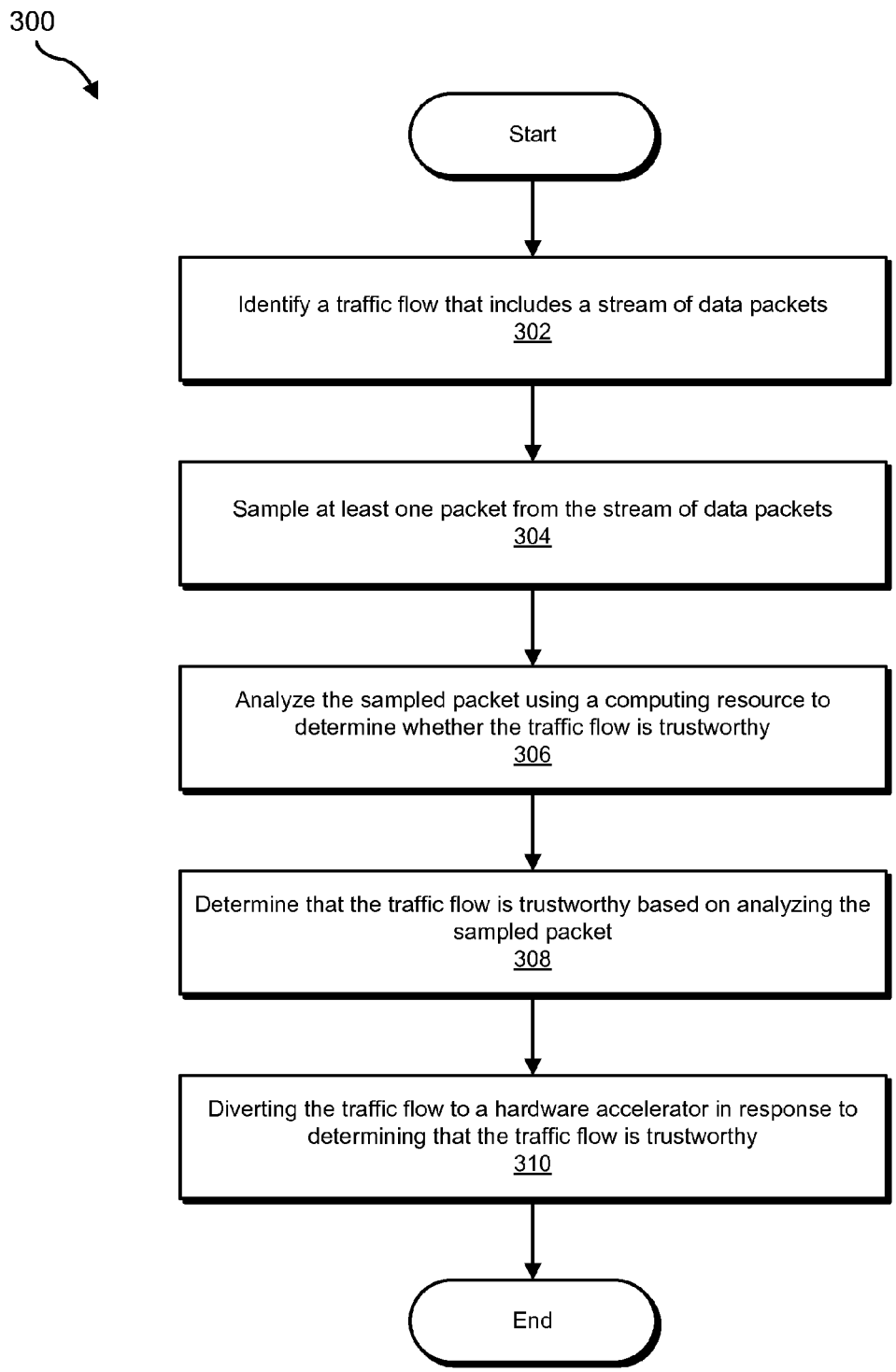
FIG. 3 is a flow diagram of an exemplary method for performing selective deep packet inspection.
Figure 4:
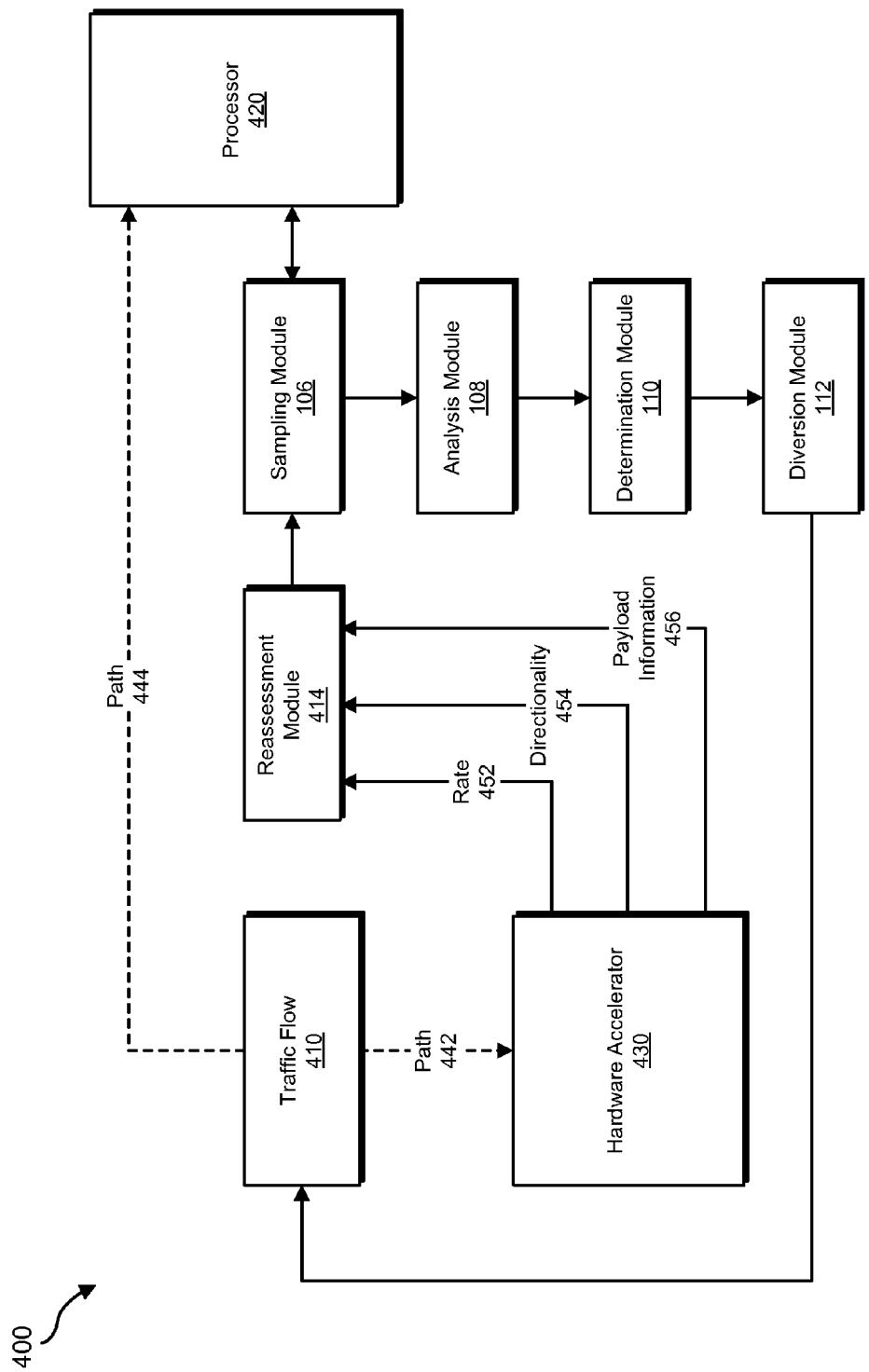
FIG. 4 is a block diagram of an exemplary system for performing selective deep packet inspection.

The following will provide, with reference to FIGS. 1, 2, and 4, detailed descriptions of exemplary systems for performing selective deep packet inspection. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing selective deep packet inspection. As illustrated in this figure, exemplary system 100 may include one or more modules 102 for performing one or more tasks. For example, and as will be explained in greater detail below, exemplary system 100 may include an identification module 104 programmed to identify a traffic flow that comprises a stream of data packets. Exemplary system 100 may also include a sampling module 106 programmed to sample at least one packet from the stream of data packets.

In addition, and as will be described in greater detail below, exemplary system 100 may include an analysis module 108 programmed to analyze the sampled packet using a computing resource to determine whether the traffic flow is trustworthy. Exemplary system 100 may also include a determination module 110 programmed to determine that the traffic flow is trustworthy based on analyzing the sampled packet. Exemplary system 100 may further include a diversion module 112 programmed to divert the traffic flow to a hardware accelerator in response to determining that the traffic flow is trustworthy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), one or more devices within network 204, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204 (e.g., receiving a traffic flow 210 from and/or relaying a traffic flow 210 for server 206).

In one embodiment, one or more of modules 102 from FIG. 1 may, when executed by at least one processor of computing device 202 and/or server 206, facilitate computing device 202 and/or server 206 in performing selective deep packet inspection. For example, and as will be described in greater detail below, one or more of modules 102 may cause computing device 202 and/or server 206 to 1) identify traffic flow 210 that includes a packet stream 212, 2) sample a packet 214 from packet stream 212, 3) analyze packet 214 using a computing resource 220 (e.g., a computing resource within and/or connected to computing device 202) to determine whether traffic flow 210 is trustworthy, 4) determine that traffic flow 210 is trustworthy based on analyzing packet 214, and 5) divert traffic flow 210 to a hardware accelerator 230 (e.g., a device within and/or connected to computing device 202) in response to determining that traffic flow 210 is trustworthy.

Computing device 202 generally represents any type or form of computing device capable of reading computer-executable instructions. Examples of computing device 202 include, without limitation, laptops, tablets, desktops, servers, networking devices, cellular phones, Personal Digital Assistants (PDAs), multimedia players, embedded systems, combinations of one or more of the same, exemplary computing system 510 in FIG. 5, or any other suitable computing device.

Server 206 generally represents any type or form of computing device that is capable of transmitting and/or receiving one or more traffic flows and/or network packets. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), a Storage Area Network (SAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for performing selective deep packet inspection. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a traffic flow that includes a stream of data packets. For example, at step 302 identification module 104 may, as part of computing device 202 in FIG. 2, identify traffic flow 210 that includes packet stream 212.

As used herein, the phrase "traffic flow" may refer to any of a variety of streams of data. For example, the phrase "traffic flow" may refer to a unicast transmission, a multicast transmission, and/or an anycast transmission. In some examples, the phrase "traffic flow" may refer to all packets transmitted (e.g., between two network addresses) via a given transport connection. Additionally or alternatively, the phrase "traffic flow may refer to all packets transmitted (e.g., between two network addresses) within a predetermined period of time. In some examples, the phrase "traffic flow" may refer to a stream of data of a predetermined length.

As used herein, the term "stream" may refer to any sequence of data packets transmitted via a network. In some examples, the term "stream" may refer to a stream of data transmitted via the Transmission Control Protocol ("TCP"). Additionally or alternatively, the term "stream" may refer to a stream of data transmitted via the User Datagram Protocol ("UDP"). As used herein, the phrase "data packet" (or "packet") may refer to any unit of data that may be transferred across a network. For example, the phrase "data packet" may refer to a network packet transmitted via a packet mode network. Additionally or alternatively, the phrase "data packet" may refer to a unit of data formatted for individual routing.

Identification module 104 may identify the traffic flow in any suitable manner. For example, identification module 104 may identify the traffic flow by identifying the creation of a traffic flow. For example, identification module 104 may identify a SYN packet and/or a SYN-ACK packet for initiating the traffic flow. In some examples, identification module 104 may operate as a part of a software module executable by one or more processors. Additionally or alternatively, identification module 104 may operate as a part a microcode module configured to identify traffic flows and/or a hardware module designed with logic to identify traffic flows.

Return to FIG. 3, at step 304 one or more of the systems described herein may sample at least one packet from the stream of data packets. For example, at step 304 sampling module 106 may, as part of computing device 202 in FIG. 2, sample packet 214 from packet stream 212.

Sampling module 106 may sample any suitable packet and/or packets. For example, sample module 106 may sample the first packet and/or first sequence of packets (e.g., of a predetermined number) from the stream of data packets.

At step 306 one or more of the systems described herein may analyze the sampled packet using a computing resource to determine whether the traffic flow is trustworthy. For example, at step 306 analysis module 108 may, as part of computing device 202 in FIG. 2, analyze packet 214 using a computing resource 220 (e.g., a computing resource within and/or connected to computing device 202) to determine whether traffic flow 210 is trustworthy.

The computing resource may include any of a variety of resources. For example, the computing resource may include one or more hardware resources, such as a central processing unit. Additionally or alternatively, the computing resource may include random access memory. In some examples, the computing resource may additionally or alternatively include one or more software resources. For example, the computing resource may include a software module. For example, the computing resource may include a software module configured to use a processor to perform a deep packet inspection on the packet. In some examples, at least a portion of the computing resource may also be configured for use by one or more additional applications. For example, the computing resource may include a processor available for use by a primary application on a host system. In some examples, as will be described in greater detail below, the systems and methods described herein may increase the availability of the computing resource by minimizing the use of the computing resource for packet analysis.

Analysis module 108 may determine that the traffic flow is trustworthy according to any of a variety of criteria. For example, analysis module 108 may determine that the traffic flow is trustworthy by determining that the traffic flow does not include a malicious payload. For example, analysis module 108 may determine that the traffic flow is trustworthy by determining that the traffic flow does not include malware, spam, an intrusion attempt, etc. In some examples, analysis module 108 may also determine whether the packet requires rerouting and/or whether the packet is out of compliance with a protocol.

Analysis module 108 may analyze the sampled packet in any of a variety of ways. For example, analysis module 108 may analyze the sampled packet by inspecting an origin of the sampled packet (e.g., by identifying a network address of a device that transmitted the sampled packet). Additionally or alternatively, analysis module 108 may analyze the sampled packet by inspecting a destination of the sampled packet (e.g., by identifying a network address to which the sampled packet is addressed). In some examples, analysis module 108 may analyze the sampled packet by inspecting the content of the sampled packet. For example, analysis module 108 may search the packet for a fingerprint of untrusted content.

At step 308 one or more of the systems described herein may determine that the traffic flow is trustworthy based on analyzing the sampled packet. For example, at step 308 determination module 110 may, as part of computing device 202 in FIG. 2, determine that traffic flow 210 is trustworthy based on analyzing packet 214.

Determination module 110 may determine that the traffic flow is trustworthy based on analyzing the sampled packet in any suitable manner. For example, determination module 110 may determine that the traffic flow is trustworthy based on a trusted origin of the sampled packet (e.g., determining that the sampled packet originated from MICROSOFT.COM). Additionally or alternatively, determination module 110 may determine that the traffic flow is trustworthy, at least in part, based on a safe destination of the sampled packet (e.g., determining that the destination of the sample packet is not vulnerable to a malicious payload and/or is configured to receive and/or analyze a malicious payload. In some examples, determination module 110 may determine that the traffic flow is trustworthy by determining that the sampled packet contains no fingerprint of a malicious payload.

At step 310 one or more of the systems described herein may divert the traffic flow to a hardware accelerator in response to determining that the traffic flow is trustworthy. For example, at step 310 diversion module 112 may, as part of computing device 202 in FIG. 2, divert traffic flow 210 to hardware accelerator 230 (e.g., a device within and/or connected to computing device 202) in response to determining that traffic flow is trustworthy 210.

As used herein, the phrase "hardware accelerator" may refer to any module, device, and/or subsystem capable of handling a traffic flow and/or stream. In some examples, the hardware accelerator may be installed on a path between a network switch and a processor (e.g., the computing resource). In some examples, the hardware accelerator may perform one or more functions for the traffic flow instead of the computing resource.

Diversion module 112 may divert the traffic flow in any suitable manner. For example, the diversion module 112 may divert the traffic flow away from the computing resource (e.g., such that the traffic flow passes through the hardware accelerator but not the computing resource). Accordingly, the systems and methods described herein may minimize the use of the computing resource for analyzing, processing, and/or handling the traffic flow.

In some examples, one or more of the systems described herein may also 1) retrieve data from the hardware accelerator useful for describing a rate of the traffic flow, 2) determine, based on the data, that the rate of the traffic flow has changed beyond a predetermined threshold subsequent to determining that the traffic flow is trustworthy, and 3) sample at least one additional packet from the traffic flow and analyzing the additional packet to reassess whether the traffic flow is trustworthy in response to determining that the rate of the traffic flow has changed beyond the predetermined threshold. In these examples, diversion module 112 may further 1) determine that the traffic flow is still trustworthy based on analyzing the additional packet and 2) divert the traffic flow back to the hardware accelerator in response to determining that the traffic flow is still trustworthy.

For example, a traffic flow established for a file syncing application may periodically check a synchronization status to determine if any files are unsynchronized. At the same time, one or more of the systems described herein may regularly read from a counter of the hardware accelerator that specifies a current bit-rate of the traffic flow. When the file syncing application initiates a new synchronization operation, the bit-rate of the traffic flow may suddenly increase. Furthermore, these systems may calculate a change in the bit-rate of the traffic flow over time. These systems may then determine that the change in the bit-rate over time exceeds a predetermined threshold (e.g., the bit-rate has quickly increased at a speed above the predetermined threshold). Accordingly, these systems may determine that the traffic flow contains substantially different information (e.g., distinct files) and requires a new assessment for trustworthiness.

FIG. 4 illustrates an exemplary system 400 for selective deep packet inspection. As shown in FIG. 4, exemplary system 400 may include a processor 420 and a hardware accelerator 430. Using FIG. 4 as an example, a traffic flow 410 may have previously been determined to be trustworthy, and therefore may have been directed via a path 442 to hardware accelerator 430. A reassessment module 414 may be configured to periodically retrieve a rate 452 from hardware accelerator 430, describing a rate of traffic flow 410. Reassessment module 414 may identify a large change in rate 452 and determine that traffic flow 410 requires a reassessment. Accordingly, reassessment module 414 may divert traffic flow 410 away from hardware accelerator 430 to processor 420 (and, e.g., sampling module 106). Sampling module 106 may then sample one or more packets from traffic flow 410, analysis module 108 may analyze the packets for trustworthiness, determination module 110 may determine that traffic flow 410 is still trustworthy, and diversion module 112 may divert traffic flow 410 back along path 442 to hardware accelerator 430.

In some examples, one or more of the systems described herein may also 1) retrieve data from the hardware accelerator useful for describing a directionality of the traffic flow, 2) determine, based on the data, that the directionality of the traffic flow has changed beyond a predetermined threshold subsequent to determining that the traffic flow is trustworthy, and 3) sample at least one additional packet from the traffic flow and analyzing the additional packet to reassess whether the traffic flow is trustworthy in response to determining that the directionality of the traffic flow has changed beyond the predetermined threshold. In these examples, diversion module 112 may further 1) determine that the traffic flow is still trustworthy based on analyzing the additional packet and 2) divert the traffic flow back to the hardware accelerator in response to determining that the traffic flow is still trustworthy.

As used herein, the term "directionality" may refer to a proportion and/or amount of network traffic travelling in one direction (e.g., as against the proportion of network traffic travelling in the other direction). For example, a traffic flow may facilitate the download of data (e.g., including minimal upstream data transfer for negotiating the download). At a later time, the traffic flow may be used to facilitate the upload of data (e.g., including minimal downstream data transfer for negotiating the upload). One or more of the systems described herein may regularly read a counter from the hardware accelerator that specifies a current directionality of the traffic flow. These systems may also identify any change in directionality of the traffic flow. The change of directionality may signal a need to reassess the trustworthiness of the traffic flow.

Accordingly, these systems may divert the traffic flow back to the computing resource for a new analysis of one or more packets of the traffic flow.

Using FIG. 4 as an example, traffic flow 410 may have previously been determined to be trustworthy, and therefore may have been directed via path 442 to hardware accelerator 430. Reassessment module 414 may be configured to periodically retrieve a directionality 454 from hardware accelerator 430, describing a proportion of upstream data transfer to downstream data transfer. Reassessment module 414 may identify a large change in directionality 454 and determine that traffic flow 410 requires a reassessment. Accordingly, reassessment module 414 may divert traffic flow 410 away from hardware accelerator 430 to processor 420 (and, e.g., sampling module 106). Sampling module 106 may then sample one or more packets from traffic flow 410, analysis module 108 may analyze the packets for trustworthiness, determination module 110 may determine that traffic flow 410 is still trustworthy, and diversion module 112 may divert traffic flow 410 back along path 442 to hardware accelerator 430.

In some examples, one or more of the systems described herein may also 1) retrieve data from the hardware accelerator useful for determining whether a payload transfer (e.g., within the traffic flow) has been completed, 2) determine, based on the data, that the payload transfer has been completed, and 3) sample at least one additional packet from the traffic flow and analyzing the additional packet to reassess whether the traffic flow is trustworthy in response to determining that the payload transfer has been completed. In these examples, diversion module 112 may further 1) determine that the traffic flow is still trustworthy based on analyzing the additional packet and 2) divert the traffic flow back to the hardware accelerator in response to determining that the traffic flow is still trustworthy.

For example, one or more of the systems described herein may identify an HTTP 1.1 request. These systems may then identify a response identifying a size of the requested resource. These systems may accordingly monitor the traffic flow (e.g., via a counter of the hardware accelerator) for a transfer of an amount of data corresponding to the size of the requested resource. These systems may thereby determine that the payload has been transferred, and that subsequent traffic within the traffic flow may include different, and potentially untrustworthy, content. Accordingly, these systems may divert the traffic flow back to the computing resource for a reassessment of the trustworthiness of the traffic flow.

Using FIG. 4 as an example, traffic flow 410 may have previously been determined to be trustworthy, and therefore may have been directed via path 442 to hardware accelerator 430. Reassessment module 414 may be configured to periodically retrieve payload information 456 from hardware accelerator 430, describing how much of a payload remains to be transferred (e.g., by describing a total amount of data transferred via hardware accelerator 430, allowing reassessment module 414 to calculate an amount of data that has been transferred since the transfer of the payload began). Reassessment module 414 may determine that the payload transfer has completed and thereby determine that traffic flow 410 requires a reassessment. Accordingly, reassessment module 414 may divert traffic flow 410 away from hardware accelerator 430 to processor 420 (and, e.g., sampling module 106). Sampling module 106 may then sample one or more packets from traffic flow 410, analysis module 108 may analyze the packets for trustworthiness, determination module 110 may determine that traffic flow 410 is still trustworthy, and diversion module 112 may divert traffic flow 410 back along path 442 to hardware accelerator 430.

As explained above, by sampling one or more packets of a traffic flow to analyze (e.g., using software-based deep packet inspection) to determine that the traffic flow is trustworthy and diverting the traffic flow to a hardware accelerator in response to determining that the traffic flow is trustworthy, the systems and methods described herein may effectively analyze network traffic without consuming the computing resources necessary to inspect each packet of network traffic. Furthermore, in some examples, the systems and methods described herein may maintain the accuracy of such trustworthiness assessments by retrieving statistical information from the hardware accelerator potentially indicating significant changes in the traffic flow, these systems and methods may temporarily divert the traffic flow back to more resource-intensive deep packet inspection methods, thereby enabling these systems and methods to reassess the trustworthiness of the traffic flow at times when the trustworthiness of the traffic flow may be most likely to change (and, e.g., maintaining the accuracy of these systems and methods while minimizing resource usage by these systems and methods).

Figure 5:
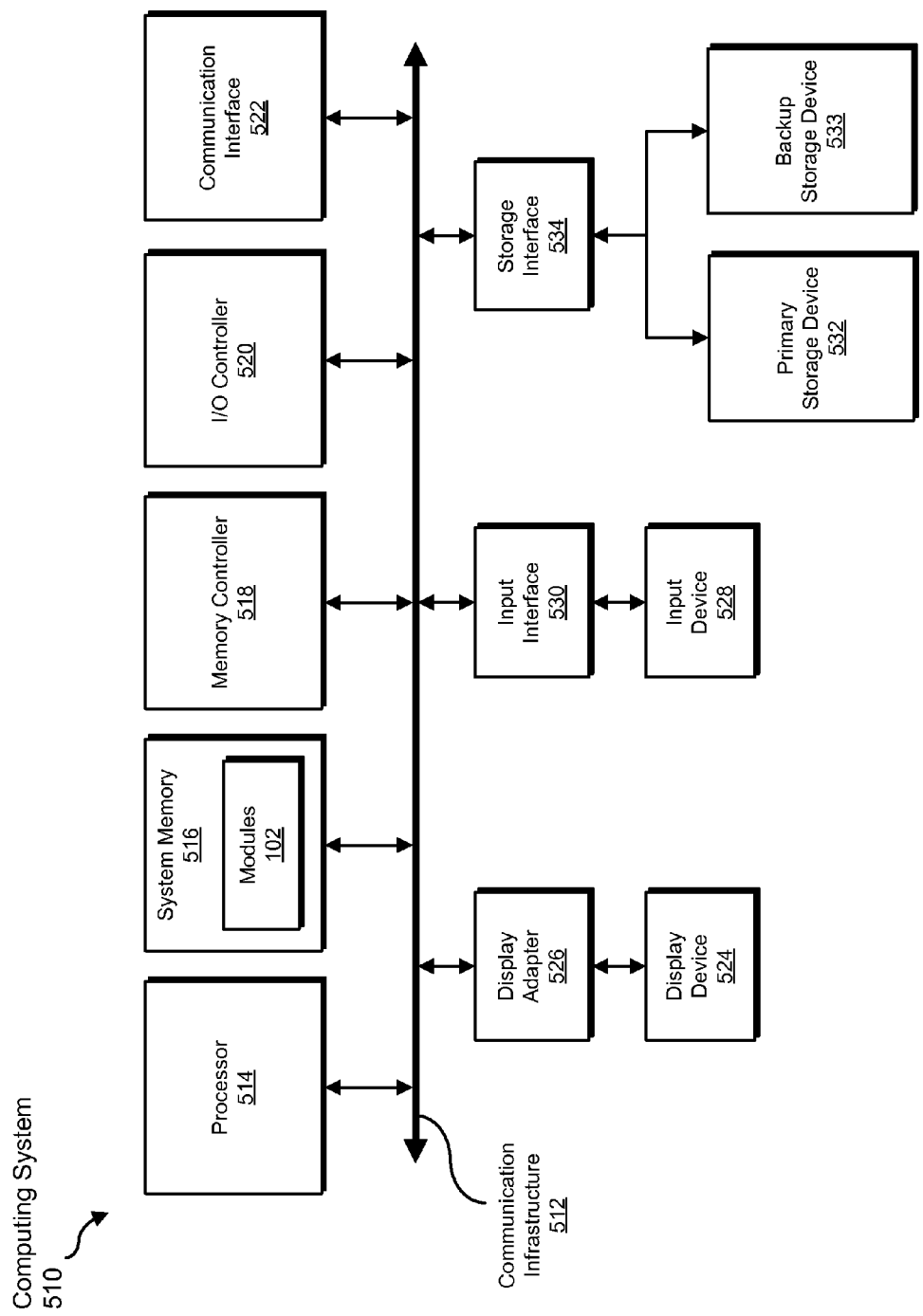
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, sampling, analyzing, inspecting, determining, diverting, and retrieving steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
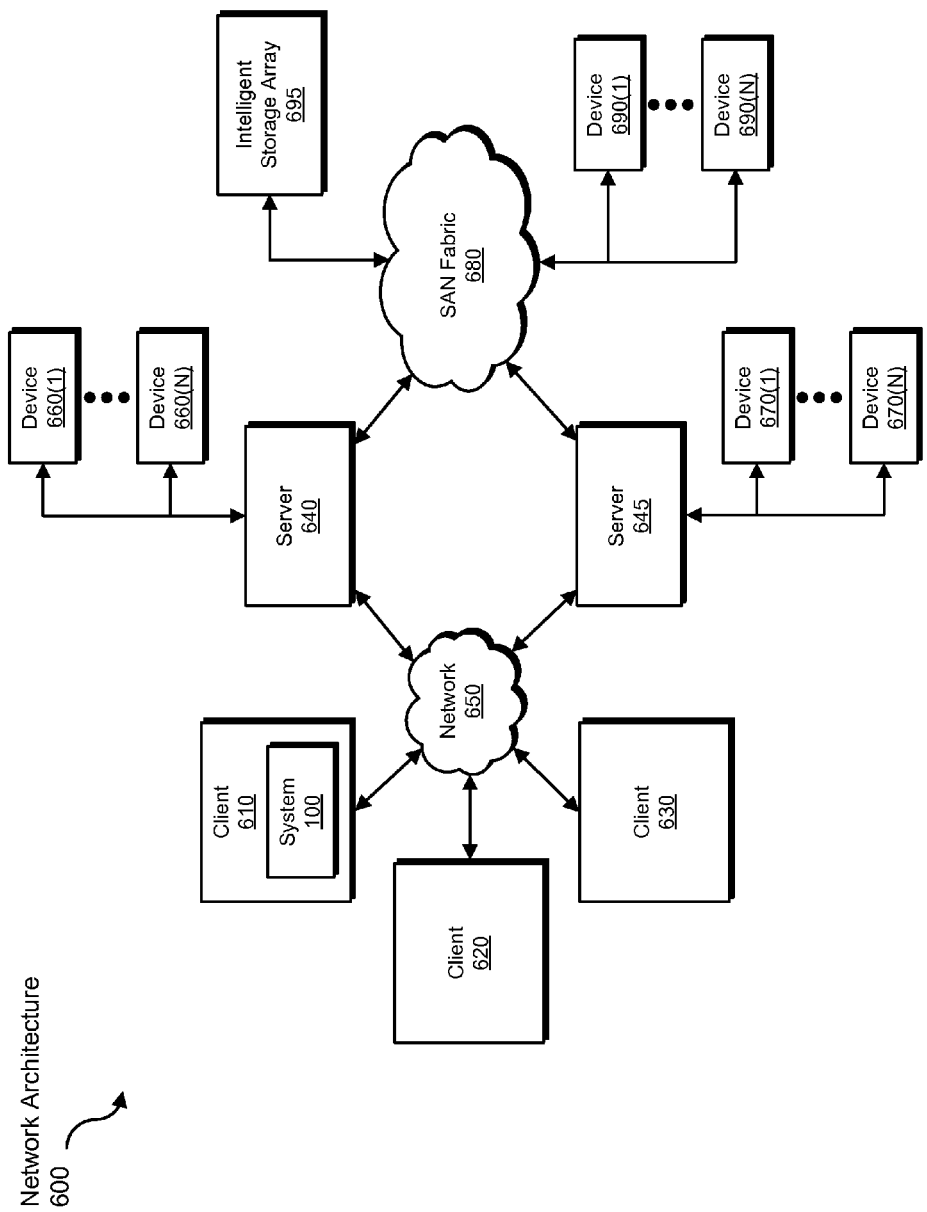
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, sampling, analyzing, inspecting, determining, diverting, and retrieving steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing selective deep packet inspection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a data stream to be transformed, transform the data stream into a trustworthiness assessment, use the result of the transformation to divert the data stream between a computing resource and a hardware accelerator, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing selective deep packet inspection, the method being performed by a computing device comprising at least one processor, the method comprising:
    identifying a traffic flow that comprises a stream of data packets;
    sampling at least one packet from the stream of data packets;
    analyzing the sampled packet using a computing resource to determine whether the traffic flow is trustworthy;
    determining that the traffic flow is trustworthy based on analyzing the sampled packet;
    diverting the traffic flow to a hardware accelerator in response to determining that the traffic flow is trustworthy;
    retrieving data from the hardware accelerator useful for describing a rate of the traffic flow;
    determining, based on the data, that the rate of the traffic flow has changed beyond a predetermined threshold subsequent to determining that the traffic flow is trustworthy;
    sampling at least one additional packet from the traffic flow and analyzing the additional packet to reassess whether the traffic flow is trustworthy in response to determining that the rate of the traffic flow has changed beyond the predetermined threshold.

2. The computer-implemented method of claim 1, wherein diverting the traffic flow to the hardware accelerator comprises diverting the traffic flow away from the computing resource.

3. The computer-implemented method of claim 1, wherein analyzing the sampled packet comprises inspecting at least one of:
    an origin of the sampled packet;
    a destination of the sampled packet;
    content of the sampled packet.

4. The computer-implemented method of claim 1, wherein the computing resource comprises at least one of:
    a central processing unit;
    a software module.

5. A system for performing selective deep packet inspection, the system comprising:
    an identification module programmed to identify a traffic flow that comprises a stream of data packets;
    a sampling module programmed to sample at least one packet from the stream of data packets;
    an analysis module programmed to analyze the sampled packet using a computing resource to determine whether the traffic flow is trustworthy;
    a determination module programmed to determine that the traffic flow is trustworthy based on analyzing the sampled packet;
    a diversion module programmed to:
        divert the traffic flow to a hardware accelerator in response to determining that the traffic flow is trustworthy;
        retrieve data from the hardware accelerator useful for describing a rate of the traffic flow;

determine, based on the data, that the rate of the traffic flow has changed beyond a predetermined threshold subsequent to determining that the traffic flow is trustworthy;

sample at least one additional packet from the traffic flow and analyzing the additional packet to reassess whether the traffic flow is trustworthy in response to determining that the rate of the traffic flow has changed beyond the predetermined threshold;

at least one processor configured to execute the identification module, the sampling module, the analysis module, the determination module, and the diversion module.

6. The system of claim 5, wherein the diversion module is programmed to divert the traffic flow to the hardware accelerator by diverting the traffic flow away from the computing resource.

7. The system of claim 5, wherein the analysis module is programmed to analyze the sampled packet by inspecting at least one of:
   an origin of the sampled packet;
   a destination of the sampled packet;
   content of the sampled packet.

8. The system of claim 5, wherein the computing resource comprises at least one of:
   a central processing unit;
   a software module.

9. A non-transitory computer-readable-storage medium comprising one or more computer-executable instructions that, when executed by at least one processor of a computing device, cause the computing device to:
   identify a traffic flow that comprises a stream of data packets;
   sample at least one packet from the stream of data packets;
   analyze the sampled packet using a computing resource to determine whether the traffic flow is trustworthy;
   determine that the traffic flow is trustworthy based on analyzing the sampled packet;
   divert the traffic flow to a hardware accelerator in response to determining that the traffic flow is trustworthy;
   retrieve data from the hardware accelerator useful for describing a rate of the traffic flow;
   determine, based on the data, that the rate of the traffic flow has changed beyond a predetermined threshold subsequent to determining that the traffic flow is trustworthy;
   sample at least one additional packet from the traffic flow and analyzing the additional packet to reassess whether the traffic flow is trustworthy in response to determining that the rate of the traffic flow has changed beyond the predetermined threshold.

10. The computer-readable-storage medium of claim 9, wherein diverting the traffic flow to the hardware accelerator comprises diverting the traffic flow away from the computing resource.

11. The computer-readable-storage medium of claim 9, wherein analyzing the sampled packet comprises inspecting at least one of:
   an origin of the sampled packet;
   a destination of the sampled packet;
   content of the sampled packet.

12. The computer-readable-storage medium of claim 9, wherein the computing resource comprises at least one of:
   a central processing unit;
   a software module.

* * * * *